US008175628B2

(12) United States Patent
Stubbings

(10) Patent No.: US 8,175,628 B2
(45) Date of Patent: May 8, 2012

(54) METHOD AND APPARATUS FOR REDUCING PUSH-TO-TALK (PTT) LATENCY IN A WCDMA NETWORK

(75) Inventor: Kevin Stubbings, Dallas, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 875 days.

(21) Appl. No.: 12/249,566

(22) Filed: Oct. 10, 2008

(65) Prior Publication Data
US 2010/0015974 A1 Jan. 21, 2010

Related U.S. Application Data

(60) Provisional application No. 61/080,802, filed on Jul. 15, 2008.

(51) Int. Cl.
*H04B 7/00* (2006.01)

(52) U.S. Cl. ........ 455/518; 455/517; 455/519; 455/520; 455/90.2

(58) Field of Classification Search ............... 455/412.1, 455/414.1, 517–520, 78, 79, 500, 90.2, 426.1, 455/422.1, 416, 420; 370/352, 389, 338, 370/328, 327, 340
See application file for complete search history.

(56) References Cited

U.S. PATENT DOCUMENTS

| 6,684,121 | B1 * | 1/2004 | Lu et al. ................... 700/108 |
| 6,765,888 | B2 * | 7/2004 | Khawand et al. ........... 370/329 |
| 7,729,685 | B1 * | 6/2010 | Chen et al. ................ 455/406 |
| 7,797,008 | B2 * | 9/2010 | Crisler et al. ............. 455/518 |
| 7,945,813 | B1 * | 5/2011 | Watson et al. ............. 714/18 |
| 7,978,684 | B2 * | 7/2011 | Vimpari et al. ............ 370/352 |
| 2003/0041000 | A1 * | 2/2003 | Zajac et al. ................ 705/37 |
| 2005/0070288 | A1 * | 3/2005 | Belkin et al. ............ 455/439 |
| 2006/0031368 | A1 * | 2/2006 | deCone .................... 709/207 |
| 2006/0221896 | A1 * | 10/2006 | Vaittinen et al. ......... 370/328 |
| 2006/0252441 | A1 * | 11/2006 | Harris et al. ............. 455/518 |
| 2007/0004517 | A1 * | 1/2007 | Mahajan ................... 463/42 |
| 2007/0049314 | A1 * | 3/2007 | Balachandran et al. .... 455/518 |
| 2007/0280256 | A1 * | 12/2007 | Forslow ................. 370/395.2 |
| 2009/0268726 | A1 * | 10/2009 | Buckley et al. ........... 370/355 |

* cited by examiner

*Primary Examiner* — Dominic E Rego

(57) ABSTRACT

A method and apparatus for reducing latency when setting up a Push-to-Talk (PTT) session from a User Equipment (UE) in a WCDMA radio communication network. When a user opens a PTT application or accesses the contacts page, the UE obtains a radio bearer from the network. The UE may maintain the radio bearer until the session is requested by transmitting periodic Heartbeat messages to the network. The Heartbeat messages have a length sufficient to trigger the network to place the user terminal on a Dedicated Channel (DCH), and the time period between Heartbeat messages is short enough to prevent the UE from being removed from the DCH for inactivity. When the user presses the PTT button, a SIP INVITE message is immediately sent without delay.

13 Claims, 4 Drawing Sheets

METHOD AND APPARATUS FOR REDUCING PUSH-TO-TALK (PTT) LATENCY IN A WCDMA NETWORK

CROSS-REFERENCE TO RELATED APPLICATIONS

This application claims the benefit of U.S. Provisional Application No. 61/080,802 filed Jul. 15, 2008, the disclosure of which is incorporated herein in its entirety.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to communication systems. More particularly, and not by way of limitation, the present invention is directed to a method and apparatus for reducing Push-to-Talk (PTT) latency in a Wideband Code Division Multiple Access (WCDMA) radio communication network.

In the PTT solution for the IP Multimedia Subsystem (IMS) Key Performance Indicator (KPI) values are used to demonstrate the expected end-to-end latency that users will experience when utilizing the PTT service. For many users, it is undesirable to utilize WCDMA for PTT service because large latencies associated with WCDMA provide a poor PTT experience for the user. Other solutions have been developed for reducing KPI values in GSM (GPRS/EDGE) for the terminating user. These solutions, such as the one disclosed in WO 2004/102997 however, looked only at reducing delays on the terminating side because in GPRS/EDGE, paging is the only real delay in the network.

Currently when an originating user in a WCDMA network presses the PTT button on his terminal, i.e., User Equipment (UE) indicating he is ready to initiate a PTT session, an application in the UE builds an INVITE message and sends the message on the WCDMA network to a Call/Session Control Function (CSCF). At this point, the UE sends a "Connection Request" message (if the UE is in IDLE state) or a "Cell Change" message (if the UE is in URA_PCH state) to obtain a Radio Bearer (RB) in the WCDMA network with which to send the INVITE message.

FIG. 1 is a call flow diagram illustrating the flow of messages in an existing procedure for initiating a PTT session in a WCDMA network when a UE 10 is in URA_PCH state. At step 11, the user pushes a PTT button on the UE, and the UE sends a Cell Update message 12 on the Random Access Channel (RACH) to the Radio Network Controller (RNC) 13. It requires about 200-250 ms to send the Cell Update message because the UE must ramp up its power to send the message, and the UE must read SIB 7 before it finally transmits its data on the RACH channel. The RNC returns a Cell Update Confirm message 14, and the UE sends a UTRAN Mobility Information Confirm message 15. The RNC then sends a Radio Link Setup message 16 to the Node B 17 serving the UE. The Node B returns a Radio Link Setup Response message 18, and the RNC sends a Radio Bearer Reconfiguration message 19 to the UE. The Node B sends a Radio Link Restore Indication 21 to the RNC, and the UE sends a Radio Bearer Reconfiguration Complete message 22 to the RNC. Finally, with the radio bearer obtained, the UE sends a SIP INVITE message 23 to the CSCF 24 to initiate the PTT session.

Steps 14-22 require approximately 800-900 ms in addition to the 200-250 ms for sending the initial Cell Update message 12. Therefore, the procedure illustrated in FIG. 1 requires a total of approximately 1.1-1.2 seconds to send out the SIP INVITE message from the time the end user presses the PTT button. Note that if the UE starts in IDLE state, it will take even longer (over 2 seconds) to send out the SIP INVITE message because a Radio Access Bearer (RAB) must also be set up towards the Core Network.

SUMMARY

Thus, a major problem with utilizing WCDMA to support PTT service is the excessive delays associated with setting up of the Radio Bearer and/or the RAB for the originating user. The user experience would be improved by reducing this setup delay on the originating side of the session. The present invention provides a method and apparatus for achieving these results. For a UE in URA_PCH state, the invention improves the end-to-end latency of the PTT application by approximately 1.1-1.2 seconds. For a UE in IDLE state, the end-to-end latency is improved by more than 2 seconds.

The solution is to have the PTT application setup and maintain the RB when the user enters the Ad-Hoc or Group menu within the PTT application. When the user presses the PTT button to request a PTT session, a SIP INVITE message is immediately sent without delay. This will decrease the end-to-end latency and improve the end user experience.

In one embodiment, the present invention is directed to a method of reducing latency when setting up a PTT session from a user terminal in a radio communication network. The method includes obtaining a radio bearer for the user terminal when a user of the terminal indicates that a PTT session will be requested in the near future; detecting that the user has requested that the PTT session be set up; and sending a PTT request message to the network utilizing the radio bearer previously obtained for the user terminal. The user may indicate that a PTT session will be requested in the near future, for example, by accessing a PTT contacts/groups page in the user terminal. The radio bearer may be maintained by transmitting periodic Heartbeat messages to the network. In one embodiment, the Heartbeat messages have a length that exceeds a network threshold for triggering the network to place the user terminal on a Dedicated Channel (DCH), and the time period between Heartbeat messages is shorter than a network time period for removing terminals from the DCH for inactivity. Thus, the Heartbeat messages maintain the UE on the DCH so that there is no delay when the user requests the PTT session.

In another embodiment, the present invention is directed to an apparatus in a user terminal for reducing latency when setting up a PTT session in a radio communication network. The apparatus includes a user interface for detecting that a user of the terminal has performed an action indicating that a PTT session will be requested in the near future; a controller in communication with the user interface for obtaining for the user terminal, a radio bearer from the network in response to the user performing the action, wherein the radio bearer is obtained prior to the user requesting the PTT session; means for the user to request the PTT session; and a transceiver for sending a PTT request message to the network utilizing the radio bearer previously obtained for the user terminal. The user may access a PTT contacts/groups page in the user terminal to indicate that a PTT session will be requested in the near future. The apparatus may also include means for maintaining the radio bearer by transmitting periodic Heartbeat messages to the network. In one embodiment, the Heartbeat messages have a length that exceeds a network threshold for triggering the network to place the user terminal on a DCH, and the time period between Heartbeat messages is shorter than a network time period for removing terminals from the DCH for inactivity. Thus, the Heartbeat messages maintain the UE on the DCH so that there is no delay when the user requests the PTT session.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

To improve the latency of the SIP INVITE message, an inventive UE 20 obtains a radio bearer and starts sending a "Heartbeat" message towards the SIP Core Network before the user initiates the SIP Session. These actions may be triggered, for example, when the user accesses the contacts/groups page of the PTT application on his UE. The "Heartbeat" message is of sufficient length to cause the WCDMA network to place the UE on a Dedicated Channel (DCH) in the network so that when the SIP INVITE message is ready to be sent, it is transmitted immediately. Thus, there is no delay for setting up the RB after the end user pushes the PTT button. This improves the end-to-end latency by approximately 1.1-1.2 seconds.

Figure 1:
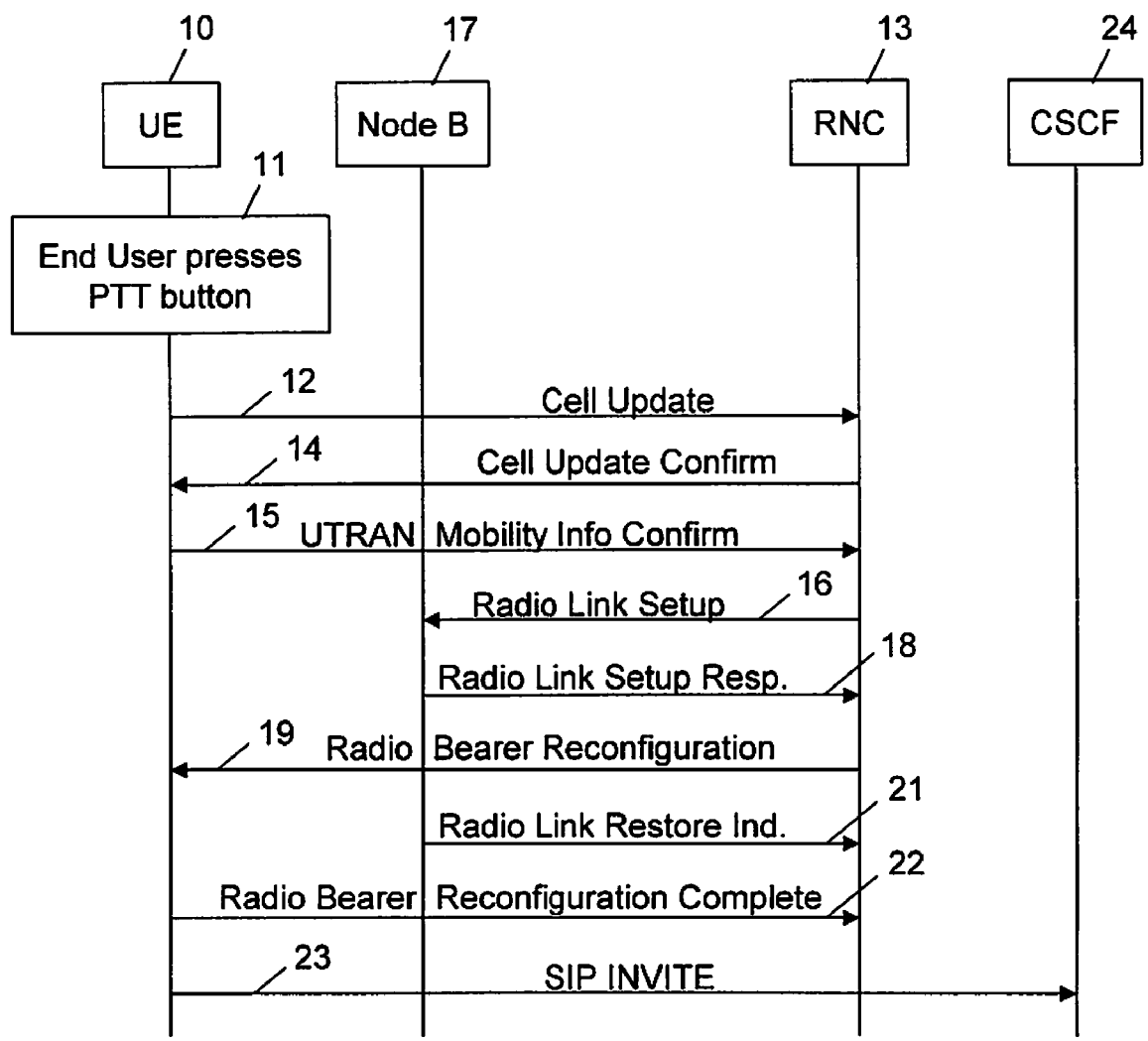
FIG. 1 (Prior Art) is a signaling diagram illustrating the flow of messages in an existing procedure for initiating a PTT session in a WCDMA network when a UE is in URA_PCH state.
Figure 2:
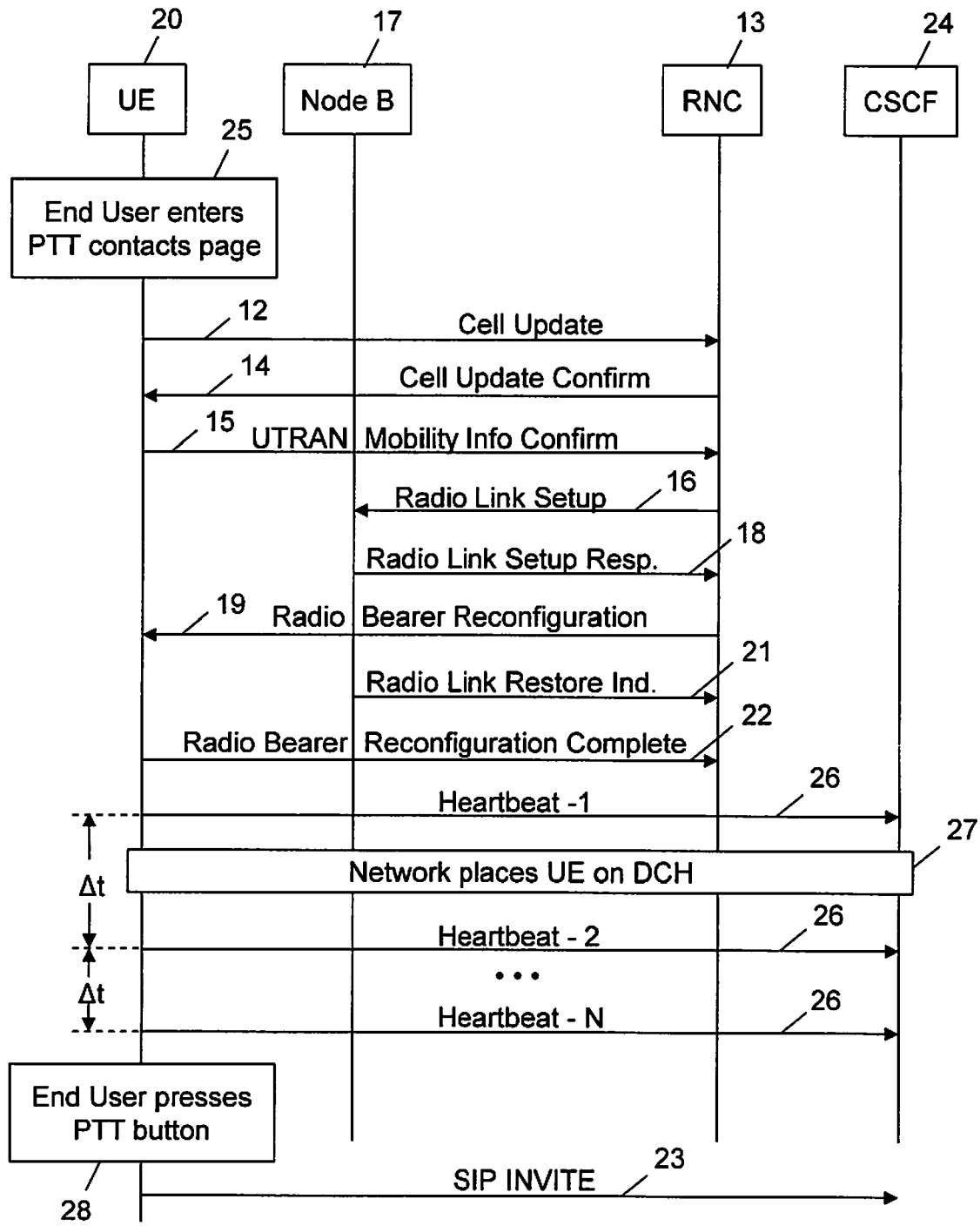
FIG. 2 is a signaling diagram illustrating the flow of messages in an exemplary embodiment of the method of the present invention.

FIG. 2 is a signaling diagram illustrating the flow of messages in an exemplary embodiment of the method of the present invention. Instead of beginning the process of obtaining a radio bearer when the end user pushes the PTT button, the present invention starts this process earlier. In the exemplary embodiment shown, the invention starts to obtain a radio bearer at step 25 when the end user enters the PTT contacts/groups page of the PTT application on the UE 20. Thus, the process shown in steps 12-22 is performed while the end user is selecting the party or parties he wants to call.

Once the radio bearer is established at step 22, the UE 20 sends a "Heartbeat" message 26 to the CSCF 24. The length of the "Heartbeat" message is made to exceed a network threshold for placing the UE on a DCH at step 27. The length of the "Heartbeat" message depends on predefined network parameters in each particular radio network. If the Heartbeat message is too small, the network will not place the UE on the DCH, and the UE will remain on the Forward Access Channel (FACH). In this case, the latency will only be improved by approximately 700 ms, because when the UE is ready to send out the INVITE message 23, a channel up-switch to the DCH will have to be performed, and this up-switch will take approximately 400-500 ms.

To maintain the UE on the DCH channel, the UE sends additional Heartbeat messages 26 until the end user presses the PTT button at step 28. The time period (Δt) between Heartbeat messages depends on the time period that the radio network allows the UE to stay on the DCH channel without any activity before the UE is down-switched to the FACH channel. Thus, Δt is selected as a value less than this time period so that the UE stays on the DCH channel.

It should be noted that the UE 20 only sends out the Heartbeat messages 26 when the end user is in the PTT application and is about to send out an INVITE message. If the UE was to continuously send out Heartbeat messages when the end user is not in the PTT application, it would drain the UE battery and waste radio resources in the WCDMA network. Additionally, if the end user leaves the PTT application without pressing the PTT button (for example, the end user changes his mind and decides not to place a PTT call), the UE stops transmitting Heartbeat messages. The network then down-switches the UE to the FACH channel and eventually back to IDLE state if there is no further activity.

By obtaining the radio bearer and maintaining the UE on the DCH channel before the end user presses the PTT button, the end-to-end latency of the PTT application is improved by approximately 1.1-1.2 ms, for a UE in URA_PCH state. For a UE in IDLE state, the end-to-end latency is improved by more than 2 seconds. This improves the overall performance and end user experience of the PTT application.

Figure 3:
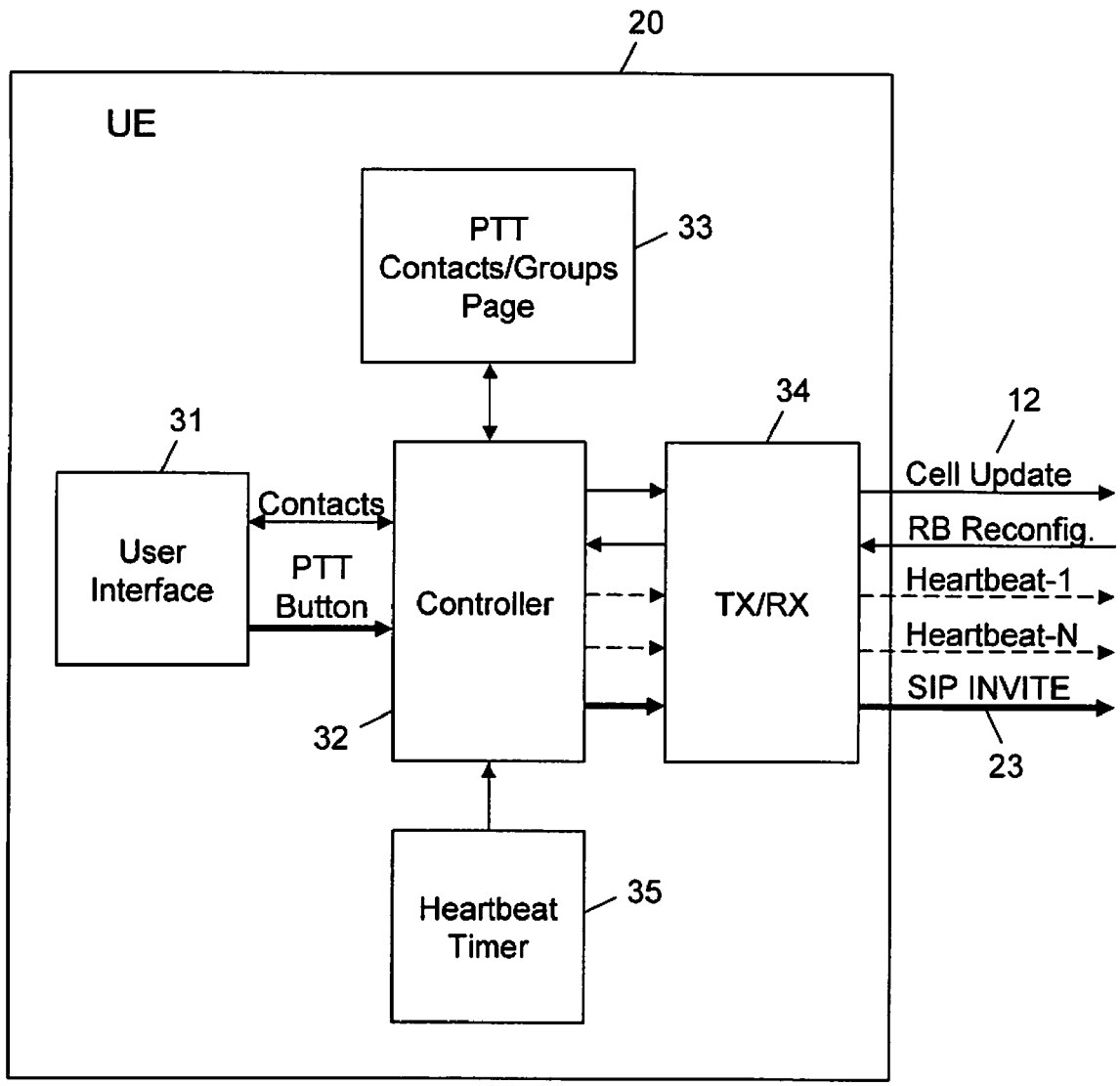
FIG. 3 is a simplified block diagram of components within the UE 20 for performing the method of the present invention.

FIG. 3 is a simplified block diagram of components within the UE 20 for performing the method of the present invention. A user interface 31 enables an end user to control and utilize the UE. The user interface communicates with a controller 32. When the end user selects through the user interface to view a PTT contacts/groups page 33, the controller extracts the contacts/groups information and displays it for the end user. At the same time, the controller controls a transceiver (TX/RX) 34 to transmit the Cell Update message 12 (FIG. 2) and begin the process of obtaining a radio bearer. While the end user browses the contacts/groups to select a party or parties he wants to call, the process of steps 12-26 of FIG. 2 is performed. Thus, a radio bearer is obtained, and a Heartbeat message of sufficient duration to cause the network to place the UE on a DCH is transmitted. A Heartbeat timer 35 periodically indicates to the controller 32 that another Heartbeat message should be sent in order to keep the UE on the DCH.

When the end user has made his selection of the party or parties he wants to call, he presses the PTT button on the user interface 31. The user interface signals this action to the controller 32, which causes the transceiver 34 to transmit the SIP INVITE message 23, thus beginning the PTT session with no delay.

Figure 4:
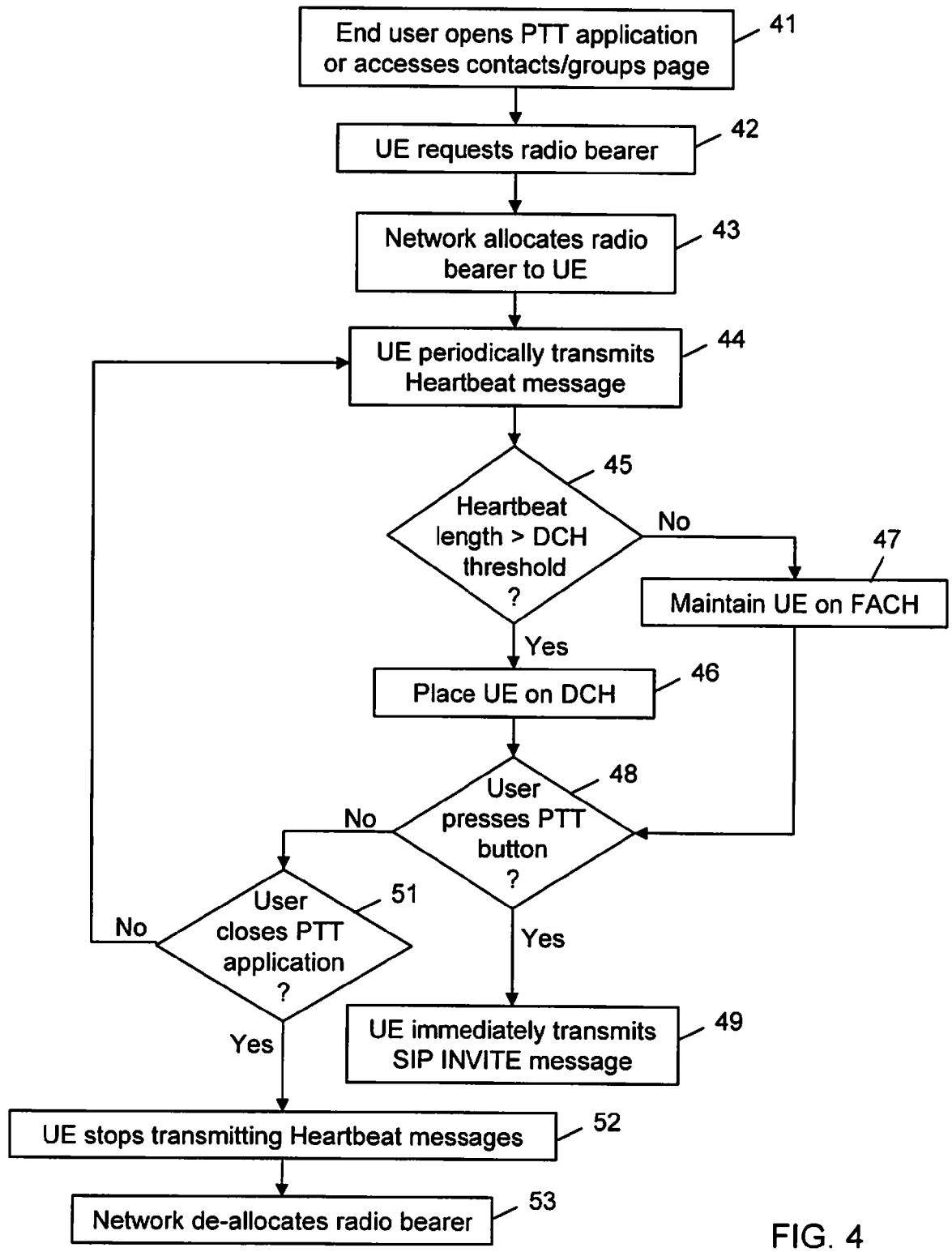
FIG. 4 is a flow chart illustrating the steps of an exemplary embodiment of the method of the present invention.

FIG. 4 is a flow chart illustrating the steps of an exemplary embodiment of the method of the present invention. At step 41, the end user opens the PTT application on his UE and/or accesses the contacts/group page in the application. At step 42, the UE requests a radio bearer as shown in the signaling diagram of FIG. 2. At step 43, the network allocates a radio bearer to the UE. At step 44, the UE periodically transmits the Heartbeat message to maintain the radio bearer.

At step 45, it is determined whether the length of the Heartbeat message is greater than the threshold for placing the UE on the DCH. If so, the network places the UE on the DCH at step 46. If the length of the Heartbeat message is shorter than the DCH threshold, the network maintains the UE on the FACH channel at step 47.

At step 48, it is determined whether the end user presses the PTT button on the UE. If so, the method moves to step 49 where the UE immediately transmits the SIP INVITE message on the DCH without delay. If the end user has not pressed the PTT button, the method moves to step 51 where it is determined whether the end user has closed the PTT application. If not, the method returns to step 44 and continues to periodically transmit the Heartbeat message. If the end user has closed the PTT application without initiating a PTT session, the method moves to step 52 where the UE stops transmitting Heartbeat messages, thereby allowing the network to de-allocate the radio bearer at step 53.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of reducing latency when setting up a Push-to-Talk (PTT) session from a user terminal in a radio communication network, said method comprising the steps of:
   obtaining a radio bearer for the user terminal when a user of the terminal indicates that a PTT session will be requested in the near future;
   maintaining the radio bearer during a time period while waiting for the user to request that the PTT session be set up;
   sending from the user terminal to the network at least one Heartbeat message having a length exceeding a network threshold for triggering the network to place the user terminal on a Dedicated Channel (DCH),
   sending a plurality of Heartbeat messages separated by a time period with a duration shorter than a network time period for removing terminals from the DCH for inactivity;
   detecting that the user has requested that the PTT session be set up; and
   sending a PTT request message to the network utilizing the radio bearer previously obtained for the user terminal.

2. The method as recited in claim 1, wherein the step of obtaining a radio bearer includes obtaining a radio bearer for the user terminal when the user of the terminal selects to view PTT contacts information stored in the user terminal.

3. The method as recited in claim 1, wherein the user of the terminal selects to view PTT contacts information by instructing the terminal to display a page of PTT contacts.

4. The method as recited in claim 1, wherein the step of detecting that the user has requested that the PTT session be set up includes detecting that the user has pressed a PTT button on the user terminal.

5. The method as recited in claim 1, wherein the user terminal is a User Equipment (UE) in a Wideband Code Division Multiple Access (WCDMA) network, and the step of sending a request message to the network includes sending a SIP INVITE message to a Call/Session Control Function (CSCF).

6. A method of reducing latency when setting up a Push-to-Talk (PTT) session from a user terminal in a radio communication network, said method comprising the steps of:
   obtaining a radio bearer for the user terminal when a user of the terminal opens a PTT application on the terminal;
   periodically transmitting a Heartbeat message from the user terminal to the network to maintain the radio bearer while the PTT application is open;
   determining whether the user initiates the PTT session or closes the PTT application;
   if the user initiates the PTT session, sending a PTT request message to the network utilizing the radio bearer previously obtained for the user terminal; and
   if the user closes the PTT application, stopping the transmission of the Heartbeat messages, thereby allowing the network to deallocate the radio bearer.

7. The method as recited in claim 6, wherein the Heartbeat message has a length that exceeds a network threshold for triggering the network to place the user terminal on a Dedicated Channel (DCH).

8. An apparatus in a user terminal for reducing latency when setting up a Push-to-Talk (PTT) session in a radio communication network, said apparatus comprising:
   a user interface for detecting that a user of the terminal has performed an action indicating that a PTT session will be requested in the near future;
   a controller in communication with the user interface for obtaining for the user terminal, a radio bearer from the network in response to the user performing the action, wherein the radio bearer is obtained prior to the user requesting the PTT session;
   the user terminal maintaining the radio bearer during a time period while waiting for the user to request that the PTT session be set up;
   transmission means for sending from the user terminal to the network at least one Heartbeat message having a length exceeding a network threshold for triggering the network to place the user terminal on a Dedicated Channel (DCH) and for
   the user terminal sending a plurality of Heartbeat messages separated by a time period with a duration shorter than a network time period for removing terminals from the DCH for inactivity;
   means for the user to request the PTT session; and
   a transceiver for sending a PTT request message to the network utilizing the radio bearer previously obtained for the user terminal.

9. The apparatus as recited in claim 8, wherein the user terminal also includes a memory for storing PTT contacts information, and the controller obtains the radio bearer for the user terminal when the user of the terminal selects to view PTT contacts information stored in the user terminal.

10. The apparatus as recited in claim 8, wherein the means for the user to request the PTT session includes detecting that the user has pressed a PTT button on the user terminal.

11. The apparatus as recited in claim 8, wherein the user terminal is a User Equipment (UE) in a Wideband Code Division Multiple Access (WCDMA) network, and the PTT request message is a SIP INVITE message sent to a Call/Session Control Function (CSCF).

12. An apparatus in a user terminal for reducing latency when setting up a Push-to-Talk (PTT) session in a radio communication network, wherein the user terminal includes a PTT application and a control processor for running the application, said apparatus comprising:
   means for detecting that a user of the terminal has opened the PTT application;
   means for obtaining a radio bearer for the user terminal in response to the user opening the PTT application;
   means for periodically transmitting a Heartbeat message from the user terminal to the network to maintain the radio bearer while the PTT application is open;
   means for determining whether the user initiates the PTT session or closes the PTT application;
   means for sending a PTT request message to the network utilizing the radio bearer previously obtained for the user terminal if the user initiates the PTT session; and means for stopping the transmission of the Heartbeat messages, thereby allowing the network to deallocate the radio bearer, if the user closes the PTT application.

13. The apparatus as recited in claim 12, wherein the means for periodically transmitting a Heartbeat message includes means for transmitting a Heartbeat message having a length that exceeds a network threshold for triggering the network to place the user terminal on a Dedicated Channel (DCH).

* * * * *